W. O. SHADBOLT.
AXLE AND AXLE BOX.
APPLICATION FILED OCT. 31, 1914.
1,148,339.
Patented July 27, 1915.
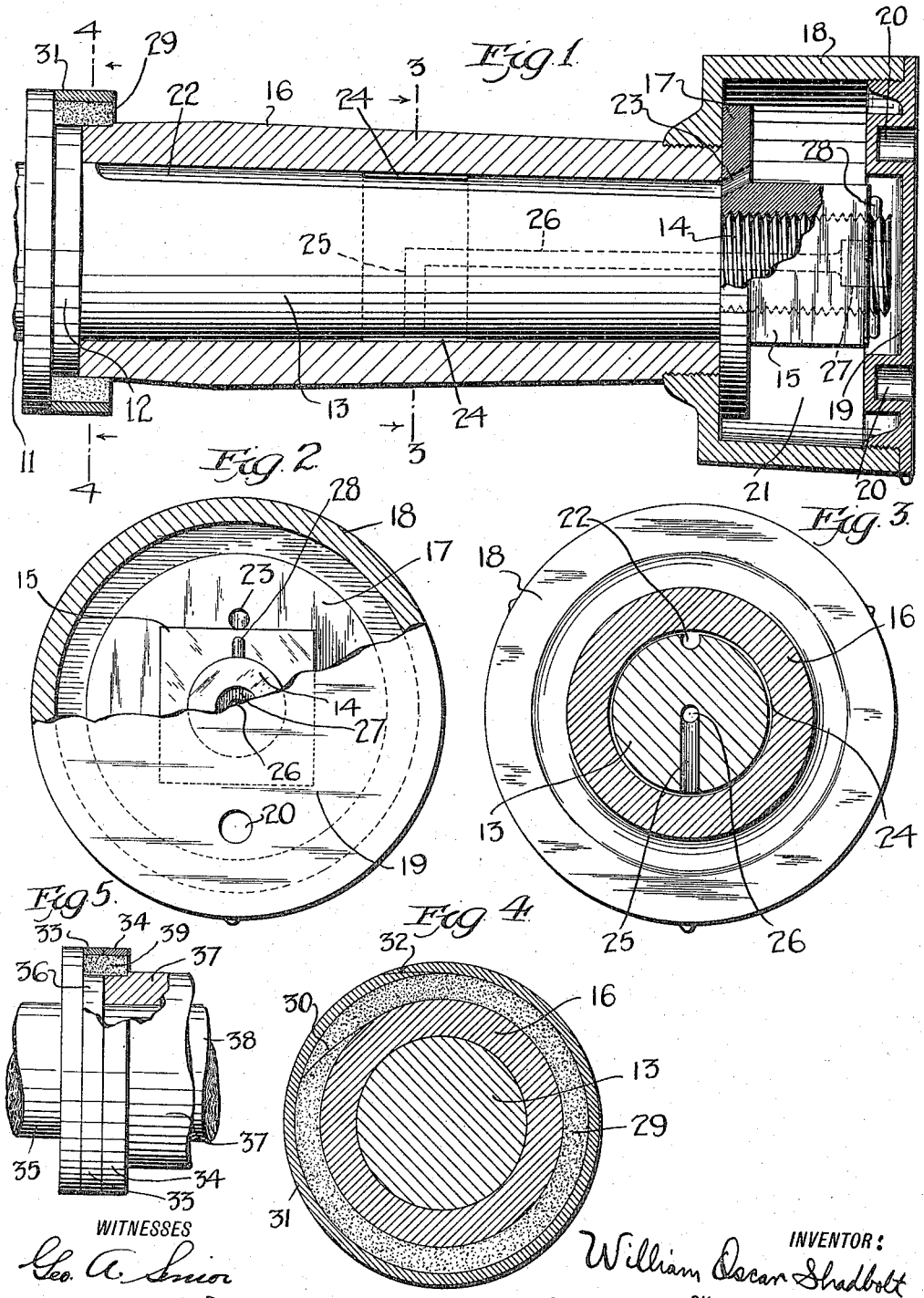

UNITED STATES PATENT OFFICE.

WILLIAM OSCAR SHADBOLT, OF NEW YORK, N. Y.

AXLE AND AXLE-BOX.

1,148,339.

Specification of Letters Patent.

Patented July 27, 1915.

Application filed October 31, 1914. Serial No. 869,642.

*To all whom it may concern:*

Be it known that I, WILLIAM OSCAR SHADBOLT, a citizen of the United States, and a resident of the borough of Brooklyn, in the city and State of New York, have invented certain new and useful Improvements in Axles and Axle-Boxes, of which the following is a specification.

My invention relates to axles and axle boxes, and more particularly to improved means for the lubrication of the same; and means whereby the escape of the lubricating material is prevented.

The invention consists in the novel construction, arrangement and combination of various devices, elements and parts as shown in the accompanying drawings, and hereinafter more particularly described.

In the said drawings, Figure 1 is a longitudinal sectional view of one form of my improved axle-box and adjacent parts; Fig. 2 is an end view of the same as seen from the right of Fig. 1, showing certain portions broken away for the disclosure of the internal parts; Fig. 3 is a sectional view taken on the line 3—3 of Fig. 1 and looking in the direction of the arrows; Fig. 4 is a sectional view taken on the line 4—4 of Fig. 1, looking in the direction of the arrows adjacent the said line 4—4; and Fig. 5 is a perspective view, partly in section, of a modified form of my invention, showing a portion of the mechanism analogous to that shown at the left of Fig. 1.

My invention is applicable to either an axle spindle provided with grooves or other channels for the circulation of lubricating material, or to the ordinary form of axle provided with a plain spindle. In this application I describe the invention as applied to an axle and spindle of the first named type, but I do not limit myself thereto.

In carrying my invention into effect in the embodiment thereof which I have selected for illustration in the accompanying drawings and description in this specification, I provide an axle, a portion of which I have shown in Fig. 1 and designated 11. This axle is provided with the usual collar 12, and a spindle 13, the end of said spindle being provided with screw threads, as shown at 14, for the reception of a nut 15. The spindle is also provided with a transverse perforation near its outer end adapted to receive a pin 28. I also provide an axle-box, as shown in the accompanying drawings, designated 16. This axle-box is held firmly against longitudinal displacement between the collar 12 and a flange 17 on the nut 15. It is, however, together with any parts which may be secured to the external side thereof, free to rotate upon the spindle 13. At the outer end of the spindle 16, and rigidly secured thereto either by means of screw threads, as shown in Fig. 1, or in any other suitable manner, is a casing 18. This casing incloses the nut 15, with its flange 17, and protects the same from injury, but its principal use is to form a receptacle 21 for the axle grease or similar substance used to lubricate the axle. This casing 18 is provided at its outer end with a cap 19 secured thereon by screw threads. (See Fig. 1). This cap is provided with two recessed portions 20, to which a spanner wrench may be applied in removing or replacing the same, and which also, by projecting into the receptacle 21, serve to keep the axle grease thoroughly mixed, and to prevent the same from adhering to the nut 15.

Extending longitudinally along the upper side of the spindle 13 is a groove 22, which is connected with the receptacle 21 by means of a perforation 23 in the flange 17 of the nut 15. Approximately midway the length of the spindle 13 is an annular groove 24, (see Figs. 1 and 3) connected at the upper side of the spindle with the groove 22. At the lower side of the spindle, and extending upward thereinto from the groove 24, is a transverse perforation 25. At the axis of the spindle, this perforation connects with a second perforation 26, extending longitudinally of the spindle from the upper end of the perforation 25 to the outer end of the screw threaded portion 14, where it connects with the receptacle 21. The perforation 26 is provided with an enlarged portion 27 at its outer end, in order that the opening may not be obstructed by the pin 28.

It has been found that when axle bearings are lubricated by any of the methods generally used, the grease tends to escape around the ends of the axle-box, wasting the same, accumulating dust, sand and grit, and if the axle is used in connection with a wooden hub or some similar device, the grease tends to rot the wood, and to loosen the spokes in their sockets. The overcoming of this objectionable feature is one of the objects of my invention. It has already been seen that all grease flowing past the outer end of the box enters the receptacle 21. As this receptacle is rigidly attached to the axle-box, and is tightly closed on all sides, no grease can escape at that end of the box. At the inner end of the axle-box it is necessary, however, to make some provision against the escape of grease between the end of the axle-box and the collar 12. For this purpose I employ a ring 29 of fiber or some similar material surrounding the junction between the said axle-box and collar. The fiber, being a comparatively soft substance will, under pressure from the outside, yield somewhat and tend to fit over the box and collar tightly enough to prevent the escape of grease. This fiber ring 29 is split, as shown at 30. If the ring wears down, or is not sufficiently tight when put on, the two portions of the ring adjacent each other on opposite sides of the split will have sufficient play with relation to each other to enable the ring to tighten up over the box and collar, provided it is subjected to pressure from the outside. The necessary external pressure is obtained by the use of a split ring of spring metal or the like, designated 31, which is sprung on over the fiber ring 29.

In the modification shown in Fig. 5, two metal split rings, here designated 33 and 34, are employed instead of the single ring 31 of Figs. 1 and 4. As the collar and box rotate with relation to each other, and as the fiber ring is a moderately tight fit upon both, it is obvious that the said fiber ring may either rotate with the box, or remain stationary on the collar, or may alternately rotate and remain stationary. It will therefore be seen that one side of the ring may become worn more than the other side, and by the use of two outer spring rings instead of one either side of the ring may be tightened to a slight degree independently of the other. In this Fig. 5 I have designated the axle 35, the collar 36, the box 37, the spindle 38, and the fiber ring 39.

The advantages of my invention will be obvious from what has been said above concerning its construction and mode of operation. I do not limit myself to the exact form described, as it is obvious that various changes could be made without departing from the spirit and scope of my invention, such as for instance, the use of the same in connection with a pulley and its shaft, being applicable either to that type of pulley which is fast on the shaft and rotates therewith, or that type which rotates about a stationary shaft; as will be readily understood.

Having thus described my invention what I claim as new and desire to secure by Letters Patent is as follows:

1. In an axle and axle-box, the combination with an axle-tree having a spindle, of an axle-box surrounding said spindle, a packing ring surrounding the line of contact between the inner end of said box and said axle, and an outer spring ring adapted to hold said packing ring in position.

2. In an axle and axle-box, the combination with an axle-tree having a spindle, a packing ring surrounding the line of contact between the inner end of said box and the axle, and a plurality of outer spring rings adapted to hold said packing ring in position.

3. In an axle and axle-box the combination with an axle-tree having a spindle, of an axle-box provided with a receptacle secured to its outer end and inclosing the end of said spindle, said receptacle being adapted to contain lubricating material and being provided with a lid, and a packing ring surrounding the line of contact between the inner end of said axle-box and said axle-tree, and an outer spring split-ring adapted to hold the said packing ring in position.

4. In an axle and axle-box the combination with an axle-tree having a spindle, of an axle-box provided with a receptacle, secured to its outer end and inclosing the end of said spindle, said receptacle being adapted to contain lubricating material and being provided with a lid having inward projections, and a packing ring surrounding the line of contact between the inner end of said axle-box and said axle-tree, and an outer spring split-ring adapted to hold said packing ring in position.

5. In an axle and axle-box the combination with an axle-tree having a spindle, and a nut on the end of said spindle, of an axle-box provided with a receptacle secured to its outer end and inclosing said nut, said receptacle being adapted to contain lubricating material and being provided with a lid, and a packing ring surrounding the line of contact between the inner end of said axle-box and said axle-tree, and an outer spring split-ring adapted to hold said packing ring in position.

6. In an axle and axle-box the combination with an axle-tree having a spindle, and a nut on the end of said spindle, of an axle-box provided with a receptacle rigidly attached to its outer end and inclosing said nut, said receptacle being adapted to contain lubricating material and being provided with a lid having inward projections, and a packing ring surrounding the line of contact between the inner end of said axle-box and said axle-tree, and an outer spring split-ring adapted to hold said packing ring in position.

7. In an axle and axle-box the combination with an axle-tree having a spindle, of an axle-box provided with a receptacle secured to its outer end and inclosing the end of said spindle, said receptacle being adapted to contain lubricating material and being provided with a lid, and a packing ring surrounding the line of contact between the inner end of said axle-box and said axle-tree, and a plurality of outer spring split-rings adapted to hold said packing ring in position.

8. In an axle and axle-box the combination with an axle-tree having a spindle, of an axle-box provided with a receptacle, secured to its outer end and inclosing the end of said spindle, said receptacle being adapted to contain lubricating material and being provided with a lid having inward projections, and a packing ring surrounding the line of contact between the inner end of said axle-box and said axle-tree, and a plurality of outer spring split-rings adapted to hold said packing ring in position.

9. In an axle and axle-box the combination with an axle-tree having a spindle, and a nut on the end of said spindle, of an axle-box provided with a receptacle secured to its outer end and inclosing said nut, said receptacle being adapted to contain lubricating material and being provided with a lid, and a packing ring surrounding the line of contact between the inner end of said axle-box and said axle-tree, and a plurality of outer spring split-rings adapted to hold said packing ring in position.

10. In an axle and axle-box the combination with an axle-tree having a spindle, and a nut on the end of said spindle, of an axle-box provided with a receptacle rigidly attached to its outer end and inclosing said nut, said receptacle being adapted to contain lubricating material and being provided with a lid having inward projections, and a packing ring surrounding the line of contact between the inner end of said axle-box and said axle-tree, and a plurality of outer spring split-rings adapted to hold said packing ring in position.

11. In an axle and axle-box the combination with an axle-tree having a spindle provided with a longitudinal groove, a longitudinal perforation, and an annular groove connecting said longitudinal perforation and said longitudinal groove; of an axle-box on said spindle provided with a receptacle adapted to contain lubricating material; and a packing ring surrounding the line of contact between the inner end of said axle-box and said axle-tree, and an outer spring split-ring adapted to hold said packing ring in position.

12. In an axle and axle-box the combination with an axle-tree having a spindle provided with a longitudinal groove, a longitudinal perforation, and an annular groove connecting said longitudinal perforation and said longitudinal groove; of an axle-box provided with a receptacle adapted to contain lubricating material, said axle-box having a lid provided with inward projections adapted to move or stir up said lubricating material; and a packing ring surrounding the line of contact between the inner end of said axle-box and said axle-tree, and an outer spring split-ring adapted to hold said packing ring in position.

13. In an axle and axle-box, the combination with an axle-tree having a spindle provided with a longitudinal groove, a longitudinal perforation, an annular groove connecting said longitudinal perforation and said longitudinal groove, and a nut having a perforation in its lateral portion; of an axle-box on said spindle provided with a receptacle adapted to contain lubricating material; and a packing ring surrounding the line of contact between the inner end of said axle-box and said axle-tree, and an outer spring split-ring adapted to hold said packing ring in position.

14. In an axle and axle-box, the combination with an axle-tree having a spindle provided with a longitudinal groove, a longitudinal perforation, an annular groove connecting said longitudinal perforation and said longitudinal groove, and a nut having a perforation in its lateral portion; of an axle-box on said spindle provided with a receptacle adapted to contain lubricating material, said axle-box having a lid provided with inward projections adapted to move or stir up said lubricating material; and a packing ring surrounding the line of contact between the inner end of said axle-box and said axle-tree, and an outer spring split-ring adapted to hold said packing ring in position.

15. In an axle and axle-box the combination with an axle-tree having a spindle provided with a longitudinal groove, a longitudinal perforation, and an annular groove connecting said longitudinal perforation and said longitudinal groove; of an axle-box on said spindle provided with a receptacle adapted to contain lubricating material; and a packing ring surrounding the line of contact between the inner end of said axle-box and said axle-tree, and a plurality of spring split-rings surrounding said packing ring and adapted to hold the latter in position.

16. In an axle and axle-box the combination with an axle-tree having a spindle provided with a longitudinal groove a longitudinal perforation, and an annular groove connecting said longitudinal perforation and said longitudinal groove; of an axle-box provided with a receptacle adapted to contain lubricating material, said axle-box having a lid provided with inward projections adapted to move or stir up said lubricating material; and a packing ring surrounding the line of contact between the inner end of said axle-box and said axle-tree, and a plurality of spring split-rings surrounding said packing ring and adapted to hold the latter in position.

17. In an axle and axle-box, the combination with an axle-tree having a spindle provided with a longitudinal groove, a longitudinal perforation, an annular groove connecting said longitudinal perforation and said longitudinal groove, and a nut having a perforation in its lateral portion; of an axle-box on said spindle provided with a receptacle adapted to contain lubricating material; and a packing ring surrounding the line of contact between the inner end of said axle-box and said axle-tree, and a plurality of spring split-rings surrounding said packing ring adapted to hold the latter in position.

18. In an axle and axle-box the combination with an axle-tree having a spindle provided with a longitudinal groove, a longitudinal perforation, an annular groove connecting said longitudinal perforation and said longitudinal groove, and a nut having a perforation in its lateral portion; of an axle-box on said spindle provided with a receptacle adapted to contain lubricating material, said axle-box having a lid provided with inward projections adapted to move or stir up said lubricating material; and a packing ring surrounding the line of contact between the inner end of said axle-box and said axle-tree, and a plurality of spring split-rings surrounding said packing ring and adapted to hold the latter in position.

19. In a pulley and bearing, the combination with a pulley, a shaft or axle for the same, and a member adapted to receive the end of said shaft or axle; of a packing ring surrounding the line of contact between the shaft or axle and the device with which it relatively rotates, and an outer spring ring adapted to hold said packing ring in position.

20. In a pulley and bearing, the combination with a pulley, a shaft or axle for the same, and a member adapted to receive the end of said shaft or axle; of a packing ring surrounding the line of contact between the shaft or axle and the device with which it relatively rotates, and a plurality of outer spring rings adapted to hold said packing ring in position.

In witness whereof I have hereunto signed my name this 30th day of October 1914, in the presence of two subscribing witnesses.

WILLIAM OSCAR SHADBOLT.

Witnesses:
 LOUISE ENDERLE,
 EDMOND CONGAR BROWN.

Copies of this patent may be obtained for five cents each, by addressing the "Commissioner of Patents, Washington, D. C."